United States Patent [19]

Zipps et al.

[11] Patent Number: 4,621,979
[45] Date of Patent: Nov. 11, 1986

[54] FAN ROTOR BLADES OF TURBOFAN ENGINES

[75] Inventors: Robert H. Zipps, East Hartford; Chester H. Rynaski, Meriden; Graham B. Fulton, Manchester, all of Conn.

[73] Assignee: United Technologies Corporation, Hartford, Conn.

[21] Appl. No.: 99,058

[22] Filed: Nov. 30, 1979

[51] Int. Cl.[4] ............................................... F01D 5/30
[52] U.S. Cl. ............................. 416/219 R; 416/223 A
[58] Field of Search ............................... 416/219, 223

[56] References Cited

U.S. PATENT DOCUMENTS

| | | | |
|---|---|---|---|
| 1,041,269 | 10/1912 | Guyor | 416/219 |
| 1,719,415 | 7/1929 | Back | 416/219 |
| 1,793,468 | 2/1931 | Donsmore | 416/219 |
| 3,986,793 | 10/1976 | Warner | 416/219 |

FOREIGN PATENT DOCUMENTS

| | | | |
|---|---|---|---|
| 587923 | 11/1933 | Fed. Rep. of Germany | 416/219 |
| 1143952 | 4/1957 | France | 416/219 |

Primary Examiner—William L. Freeh
Attorney, Agent, or Firm—Robert C. Walker

[57] ABSTRACT

The present invention provides improvements to fan rotor blades of turbofan gas turbine engines. Increased low cycle fatigue life is sought, and a specific object is to obtain a more nearly uniform chordwise distribution of maximum stress levels across the root sections of fan blades.

In one effective embodiment incorporating concepts of the present invention the root section of a fan blade is contoured to an arcuate geometry which approximates the contour of the airfoil cross section at the inner wall of the working medium flowpath. Further contour specifications for reducing local stress levels are discussed.

4 Claims, 9 Drawing Figures

FAN ROTOR BLADES OF TURBOFAN ENGINES

TECHNICAL FIELD

This invention relates to fan blades of turbofan, gas turbine engines, and more particularly to the attachment of such blades to densely loaded rotors in such engines.

The concepts were developed in the turbofan field to reduce maximum stress levels in fan stage rotor blades at the region of geometric transition between airfoil and root sections of the blades. The concepts have applicability, however, to other fields in which similarly configured parts are employed.

BACKGROUND ART

The root sections of fan blades currently operative in turbofan engines around the world, employ straight root attachments in which the mean lines of each blade root and of the corresponding attachment slot extend diagonally across the rim of the disk. Such designs have heretofore proved adequately successful in securing the blades to the disk. Future turbofan engines, however, are likely to incorporate fan blades subjected to higher tip speeds, and resultantly greater restraining forces need be applied at the root sections. In such engines much attention need be given to concentrated stress levels along the span of the fan blades, such as occurs at conventionally integrated flow confining platforms and at the root sections. It is the reduction of such concentrated stress levels to which the present concepts are directed.

Although a novel structure is taught herein, some prior constructions bearing geometric similarity to the fan blades of the present invention are found in the steam turbine art field and in the gas turbine art field. Representative illustrations in the steam turbine field include those shown in U.S. Pat. Nos. 1,041,269 to Guyer entitled "Blading for Turbines"; 1,719,415 to Back entitled "Turbine Blade Attachment"; 1,793,468 to Densmore entitled "Turbine Blade"; and 3,986,793 to Warner et al entitled "Turbine Rotating Blade". Each of the patents discloses turbine blades having root sections formed to arcuate geometries so as to be proximately contoured to the respective airfoils. In each instance the root sections are of uniform cross section geometry across the attachment.

Within the gas turbine engine field, a geometrically similar but technically distinct construction is disclosed in French Pat. No. 1,143,952. By the disclosed structure, an arcuated root geometry is applied to a cooled turbine blade for the purpose of enabling cooling air to flow into a multi-passage blade. In one turbine structure of the French patent the roots of the blades are flared so as, according to the reference, to be held firmly into the turbine assembly by a wedging action. Note, however, that the expected aerodynamic loads on the blade are in a direction tending to unseat the wedged root. Additionally, note that the center of mass of the blade is located over a region of comparatively smaller root cross sections.

Notwithstanding the above described disclosures of the curved and/or tapered roots of turbine blades, fan blade roots have remained configured to straight geometries.

DISCLOSURE OF INVENTION

According to the present invention a nearly uniform chordwise distribution of local stress levels in the root section of a platformless fan blade is provided by tapering the root section from the downstream end to the upstream end of the blade about an arcuate mean line which approximates the projected mean line of the airfoil cross section taken along the inner wall of the working medium flowpath.

In accordance with one detailed embodiment of the invention the airfoil cross section mean line is a non-circular arc and the root section mean line is a circular arc which is co-extensive with the airfoil cross section mean line at the trailing edge region of the blade and is slightly offset therefrom to the suction side of the airfoil at the leading edge region of the blade.

A primary feature of the present invention is the geometry of the root section of the blade. The root section has an arcuate curvature which approximates the curvature of the airfoil section at the inner wall of the working medium flowpath. Further, the root section is tapered convergently from the downstream to the upstream end of the fan blade to provide increased cross sectional area in regions of high centrifugal loads without increasing the blade root section density at the upstream end of the disk in which the rotor blades are to be installed. In one detailed embodiment, the root section is formed about a circular arc mean line. Teeth of the root section extend laterally from the mean line to corresponding circular arcs which are formed from points equidistant from the point from which the mean line is formed. Single teeth, as in the case of a dovetail type, attachment, or multiple teeth, as in the case of a firtree type attachment are employable.

A principal advantage of the present invention is the avoidance of locally high stresses in the transition region between the fan blade root and airfoil sections, Maximum stresses typically occurring in the forward portion of the suction side of the root and in the rearward portion of the pressure side of the root are reduced through the incorporation of the arcuate root geometry. Stress concentration factors along the span of the blade are avoided by attaching flow defining means directly to the rotor disk in lieu of integrally incorporated blade platforms. Effective employment of an arcuate root geometry is enabled by tapering the root in the leading edge region. The maximum membrane stress attributable to centrifugal pull, which typically occurs at approximately seventy-five percent (75%) of chord, is reduced through tapering by providing additional root cross sectional area in that region. Additionally, the root geometry of the present invention enables the design of sophisticated airfoil contours without generating excessive stress levels inherent in convention root designs.

The foregoing, and other features and advantages of the present invention, will become more apparent in the light of the following description and illustrations of the presently contemplated best mode for carrying out the invention.

BEST MODE FOR CARRYING OUT THE INVENTION

Figure 1:
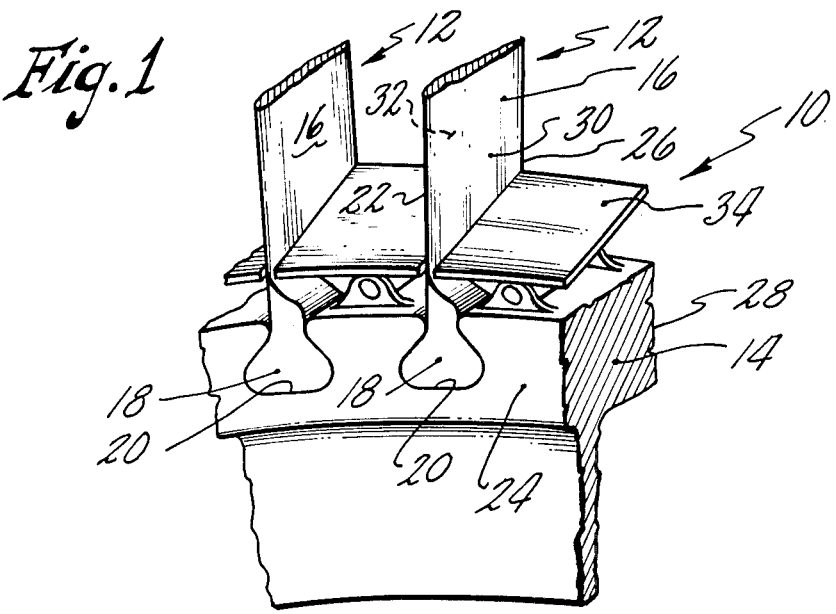
FIG. 1 is a simplified illustration of a portion of a fan assembly of a turbofan engine incorporating the rotor blade of the present invention.

Concepts of the present invention are illustrated in FIG. 1 as incorporated in the fan assembly 10 of a turbofan, gas turbine engine. A plurality of fan blades 12 extend outwardly from a rotor disk 14. Each blade has an airfoil section 16 and a root section 18. The root section illustrated has a "dovetail" cross section geometry and engages a correspondingly configured slot 20 in the rotor disk. Each blade further has an upstream or leading edge 22 at the upstream end 24 of the disk and a downstream or trailing edge 26 at the downstream end 28 of the disk. Each blade has a suction side 30 of convex geometry and a pressure side 32 of concave geometry. In the embodiment shown, an inter-blade platform 34 extends between the suction side of each blade and the pressure side of the adjacent blade. The platforms between blades in composite form the inner wall of the working medium flowpath across the fan blades. As illustrated, each platform is hingedly attached directly to the rotor disk. In other embodiments the periphery of the rotor disk may form the inner wall of the working medium flowpath.

Figure 3:
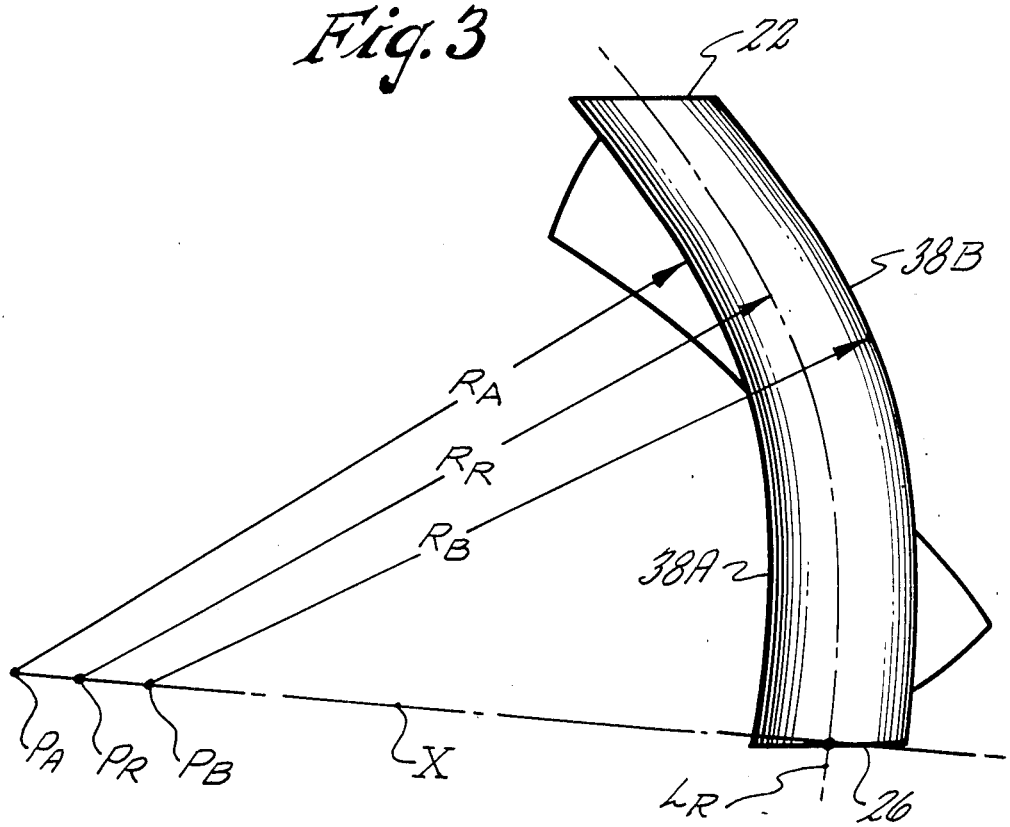
FIG. 3 is a bottom view of the root section of the FIG. 1 blade showing the arcuate curvature and tapered geometry of the blade.
Figure 2:
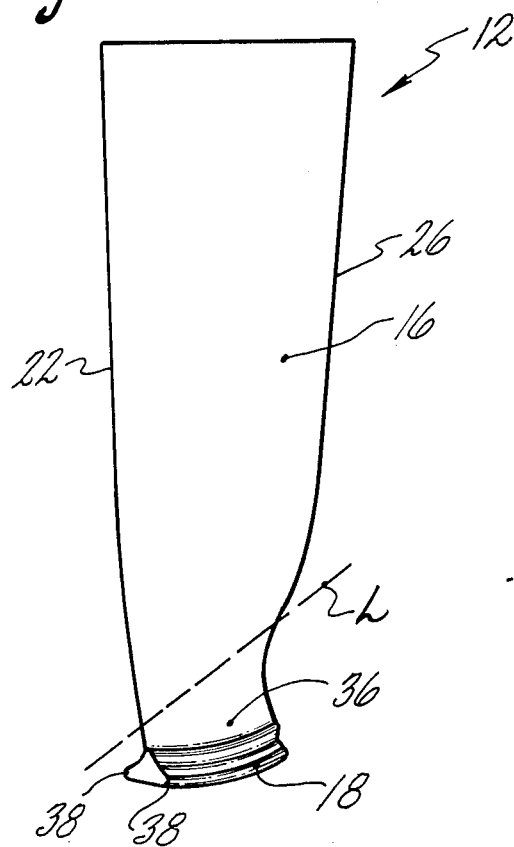
FIG. 2 is a perspective view of a fan blade of the type incorporated in such engine.

A fan blade 12 constructed in accordance with the concepts of the present invention is illustrated in the FIG. 2 perspective view and the corresponding FIG. 3 end view. The intended line of abutment L of the adjacent platform is shown therein indicating the innermost portion of the flowpath for working medium gases. A region of transition 36 extends between the airfoil section 16 and the root section 18. The root section is formed to an arcuate geometry and includes a pair of similarly contoured teeth 38 extending laterally in the root section.

The arcuate contour of the root section is readily viewable in the FIG. 3 end view. The teeth 38A and 38B are formed about a circular mean line having a radius $R_R$. The radius is scribed from a point $P_R$ which lies laterally of the root section between the leading and trailing edges. The root section is tapered convergently about the mean line $R_M$ from the trailing edge 26 or downstream end of the blade to the leading edge 22 or upstream end of the blade. The convex curvature of the tooth 38A and the concave curvature of the tooth 38B are formed to substantially equal radii $R_A$ and $R_B$ respectively. The centers of curvature $P_A$ and $P_B$ respectively, are located on a line which passes through the point $P_R$ and the point of intersection of the root mean line with the downstream or trailing edge 26 of the root section. The points $P_A$ and $P_B$ are equidistant from the point $P_R$ thusly providing a uniform taper to the root section along the mean line.

Figure 4:
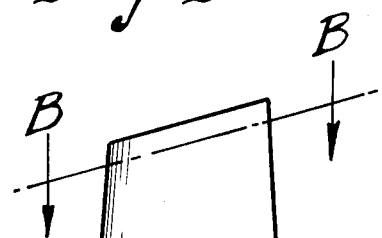
FIG. 4 is a suction side view of the FIG. 1 blade.
Figure 5:
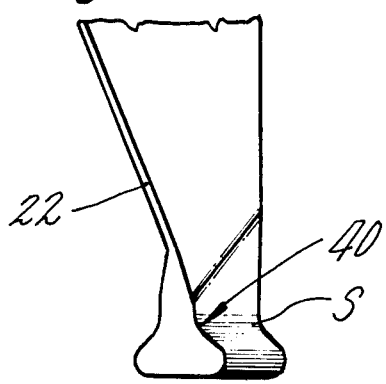
FIG. 5 is a front end view showing the root section at the leading edge of the FIG. 1 blade.

FIG. 4 is a suction side elevation view of the FIG. 2 blade and FIG. 5 is a leading edge or front view of the same blade. The maximum membrane stress attributable to centrifugal pull occurs in such a blade near the chordwise center of mass which is typically at approximately seventy-five percent (75%) of chord in the region S. Locally higher stresses at the surfaces of the blade occur as a result of the tendency of the airfoil section to untwist, on the concave side of the airfoil at approximately twenty-five percent (25%) of chord in the region $S_1$ and on the convex side of the airfoil at approximately seventy-five percent (75%) of chord in the region $S_2$. Such stresses have a maximum effect through typical stress concentration factors on the order of two and five-tenths to three and five-tenths (2.5–3.5) at the fillet radii 40 above the teeth of the dovetail attachment.

It is highly significant that the fan blades of the present invention do not have integrally incorporated platforms for defining the inner wall of the working medium flowpath. Such platforms are mounted, in lieu thereof, directly to the rotor disk by a suitable technique such as the hinge and pin structure illustrated in FIG. 1. Removing the platforms from the suction side walls and the pressure side walls of the fan blades eliminates stress concentration in regions of high bending stress at the juncture between the walls and the root section of the blade. The application of stress concentration factors on the order of one and two-tenths to one and four-tenths (1.2–1.4) at the juncture of platform and airfoil sections make typical blades of the prior art stress limited in that region. Such life limiting stress are avoided in the present structure.

Although platformless blades are not new, the concept does comprise a portion of the inventive subject matter contained herein as employed with the new root geometry. Free of such stress concentration described above, the platformless fan blades of the present invention become stress limited at the fillet radii between blade airfoil and root sections. Accordingly, the concepts of the present invention are directed to stress reductions along the fillet radii between the blade airfoil and root sections. For purposes of illustrating the concepts of the present invention the new fan blade of FIG. 6 having a curved, tapered root section is compared to the more traditional fan blade of FIG. 7 having a straight, diagonal root. The blades were computer modeled under design conditions in which the pressure ratio across the root of the blade was one and seven-tenths (1.7) and the pressure ratio across the tip of the blade was one and nine-tenths (1.9). The tip speed at the design condition was set at one thousand six hundred eighty feet per second (1,680 fps).

Geometrically each blade had a root chord of four and eighty-five one hundredths of an inch (4.85 in.) and a span of seventeen and five tenths inches (17.5 in.) with an aspect ratio (average airfoil span length divided by average airfoil root length) of three and six-tenths (3.6). Each blade was considered to have been fabricated of high strength titanium alloy. Material properties of AMS 4928 titanium alloy were employed. The concepts of the present invention are equally applicable to other material systems of both metallic and non-metallic composition. The concepts may be particularly attractive in high modulus, high strength fiber reinforced structures.

Figure 6:
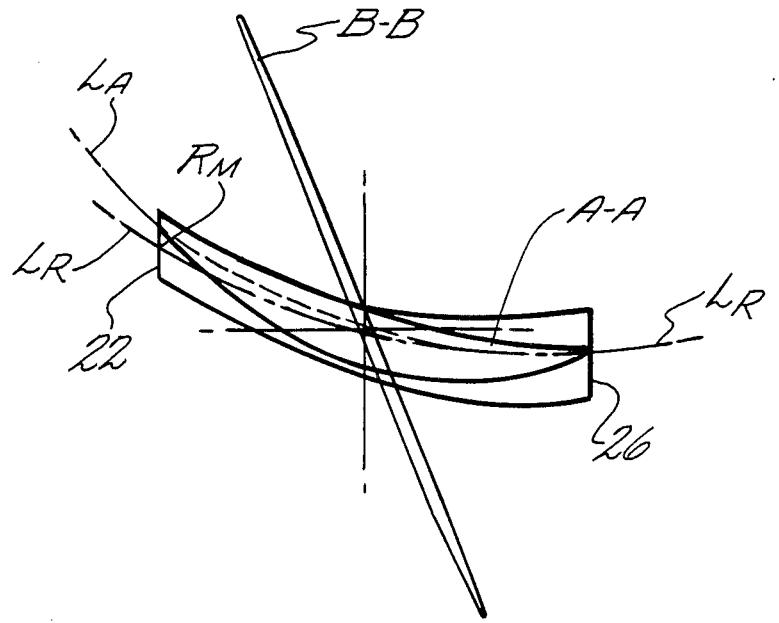
FIG. 6 is a top view of the blade showing projections of the section views A—A and B—B of FIG. 4 onto the blade root.
Figure 7:
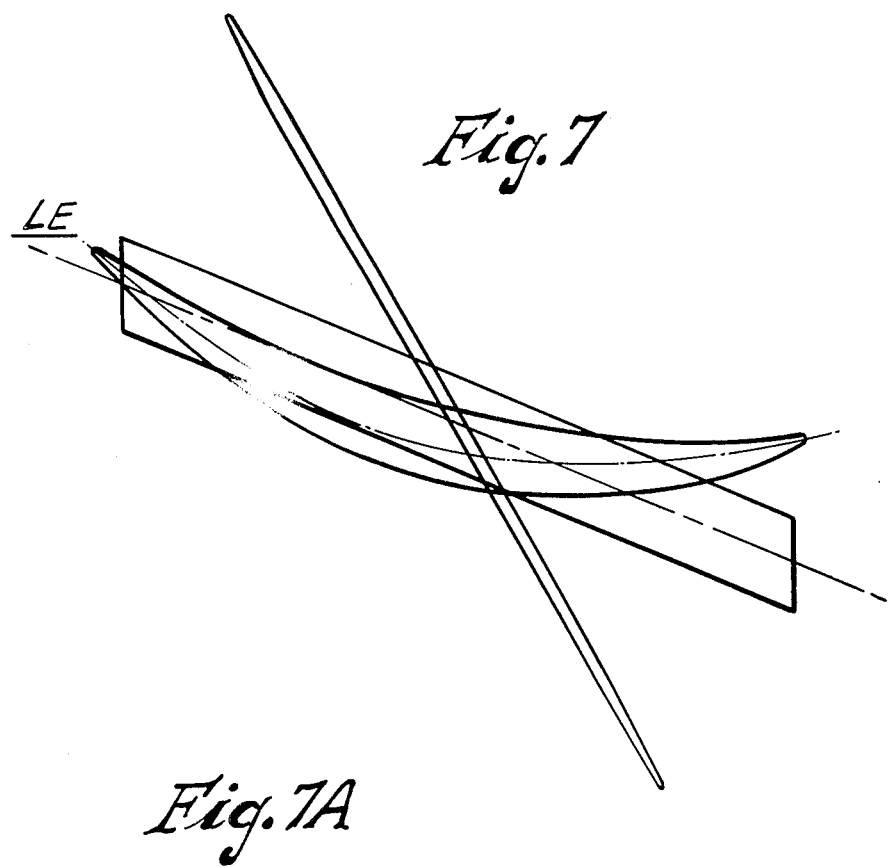
FIG. 7 (Prior Art) is a view corresponding to the FIG. 6 view showing theoretical projections of the sections A—A and B—B onto a straight blade root.

The FIG. 6 and FIG. 7 (Prior Art) illustrations correspond to the top view of the FIG. 4 blade with sections A—A and B—B projected onto the root geometry. Section A—A is taken through the blade at the inner wall of the working medium flowpath and Section B—B is taken through the tip region of the blade. Under aerodynamic loads the airfoil section tends to untwist in the counter-clockwise direction as viewed in FIG. 6 and in FIG. 7 (Prior Art).

In the FIG. 6 blade of the present invention the blade cross section A—A is at the inner wall of the working medium flowpath and is formed about a non-circular arc mean line $L_A$. The mean line $L_R$ of the root section is a circular arc and has a radius of curvature $R_R$ which generates a mean line of approximate curvature to that of the non-circular arc mean line $L_A$. In optimumization of the structure, it has been determined that the lowest stresses result in configurations where the leading edge region of the mean line $L_R$ is offset to the convex or suction side of the mean line $L_A$ and where the trailing edge region of the mean line $L_R$ is co-extensive with the mean line $L_A$. Further, as is viewable more readily in FIG. 3, in structuring the tapered geometry of the root section, a straight reference line X is scribed to pass through the point $P_R$ and through the intersection of the root mean line $L_R$ with the downstream or trailing edge 26. The concave tooth 38A and the convex tooth 38B extend to curvatures of correspondingly equal radii $R_A$ and $R_B$ from respective centers $P_A$ and $P_B$ which are on the line X at equal distances from the point $P_R$.

Curving the root section to the arcuate geometry illustrated has the benefit of reducing local bending stresses in the region of transition between the blade root and the blade airfoil sections. Local bending stresses result from the tendency of the blade to untwist under centrifugal and aerodynamic loads. Reducing the bending stress collaterally reduces the peak stress with a resultantly lower tendency for crack generation and propagation. Cracks generating on the surface is a result of higher stresses in that region tend to propagate toward the center of the blade with increasing frequency. When sufficient propagation has incurred, failure of the blade results. The avoidance of cracked generation and reduced tendency toward cracked propagation from the surface of the metallic structure is achieved by reducing the maximum stress in that region.

Figure 6A:
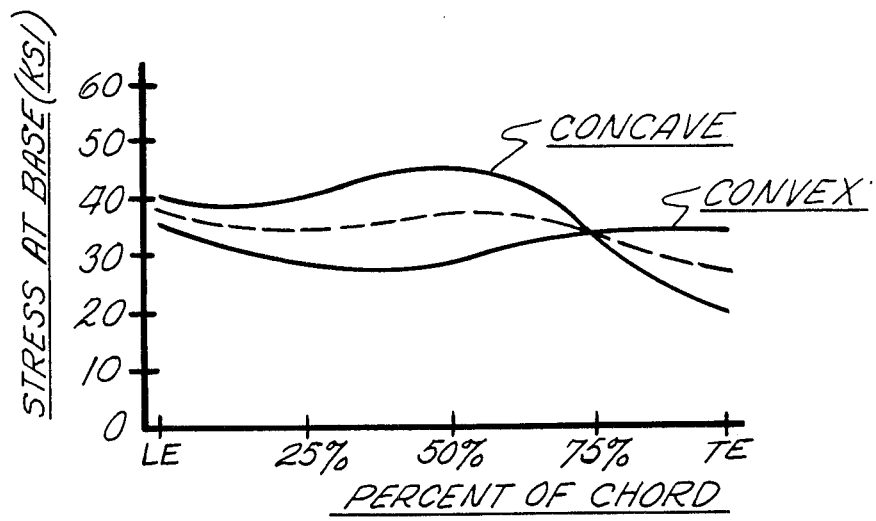
FIG. 6A is a plot of the chordwise distribution of stress levels at the section of maximum stress in the root of the FIG. 6 blade.
Figure 7A:
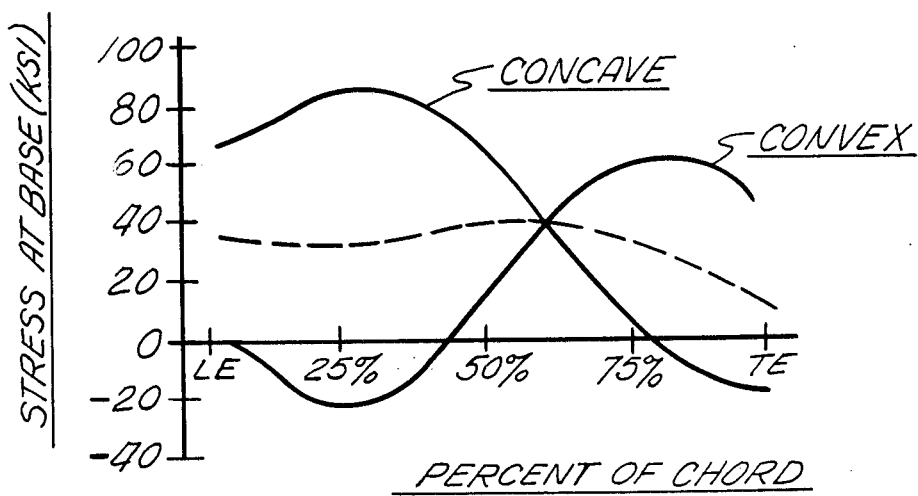
FIG. 7A (Prior Art) is a plot of the chordwise distribution of stress levels at the section of maximum stress in the root of the theoretical FIG. 7 blade.

Calculated surface stresses along the fillet radii on the concave and convex sides of the blades are plotted on the corresponding FIG. 6A and FIG. 7A (Prior Art) graphs to show chordwise distributions of stress levels. Note particularly in the FIG. 7A (Prior Art) graph of the conventional straight root blade that stress levels peak on the concave side of the blade at approximately twenty-five percent (25%) of chord at eighty-five thousand pounds per square inch (85,000 psi) and again at approximately seventy-five percent (75%) of chord at sixty thousand pounds per square inch (60,000 psi) on the convex side of the blade. Corresponding data for the compared blade with a root geometry contoured to the concepts of the present invention has been calculated and are plotted in the FIG. 6A graph. Peak stresses comparatively occurring at twenty-five percent (25%) of chord in the straight root blade and at seventy-five percent (75%) of chord in the straight root blade have been substantially reduced. On the concave side of the blade the stress levels are at a more nearly uniform level, peaking at fifty percent (50%) of chord at a magnitude of approximately forty-five thousand pounds per square inch (45,000 psi). Correspondingly, stresses on the convex side of the airfoil are comparatively reduced to a nearly uniform level value of approximately thirty-five thousand pounds per square inch (35,000 psi).

A stress concentration factor in tensile loading of two and eight-tenths (2.8) and a stress concentration factor in bending of 1.6 were applied to the data of FIG. 7A (Prior Art) to provide a total concentrated stress of one hundred seventy-seven thousand pounds per square inch (177,000 psi). Application of the same stress concentration factors of a maximum concentrated stress of one hundred eighteen thousand pounds per square inch (118,000 psi).

The magnitude of the stress reduction provided herein is great, but is even more significantly expressed in terms of low cycle fatigue life. It is known for example, that a ten percent (10%) reduction in stress results in a roughly one-hundred percent (100%) improvement in low cycle fatigue life.

Although the invention has been shown and described with respect to detailed embodiments thereof, it should be understood by those skilled in the art that various changes and omissions in form and detail may be made therein without departing from the spirit and the scope of the invention.

We claim:

1. A fan blade of the type extending outwardly from a rotor disk across the annular flowpath for working medium gases in the fan section of a turbofan engine, including:
   an airfoil section having an arcuate cross section contour at the inner wall of the working medium flowpath; and
   a root section having an upstream end and a downstream end wherein
      the root section is formed to an arcuate contour which approximates the arcuate contour of the airfoil cross section at the inner wall of the working medium flowpath projected onto the root section, and wherein
      the root section is convergently tapered from the downstream end toward the upstream end of the blade.

2. The fan blade according to claim 1 wherein the fan blade has a suction side and a pressure side and wherein the projected airfoil cross section has a non-circular arc, mean line $L_A$ and wherein the root section has a circular arc mean line $L_R$
   the non-circular arc mean line $L_A$ of the projected airfoil cross section being offset to the suction side of the blade from the circular arc mean line $L_R$ at the upstream end of the blade and being essentially coextensive with the circular arc mean line $L_R$ at the downstream end of the blade.

3. The fan blade according to claim 2 wherein the circular arc mean line $L_R$ has a radius $R_R$ which is scribed from a point $P_R$ laterally of the blade between the upstream end and the downstream end of the blade.

4. The fan blade according to claim 3 which includes at least one arcuate tooth at the suction side of the blade and at least one arcuate tooth at the pressure side of the blade, the teeth extending to approximately equal radii $R_A$ and $R_B$, respectively from points $P_A$ and $P_B$, respectively which lie on a line X at equal distances from the point $P_R$ wherein the line X extends through the point $P_R$ and the intersection of the root mean line $L_R$ with the downstream edge of the blade.

* * * * *